(12) United States Patent
Korf et al.

(10) Patent No.: US 8,915,284 B2
(45) Date of Patent: Dec. 23, 2014

(54) METHOD AND APPARATUS FOR APPLYING STRIPS TO SURFACES

(75) Inventors: Gregory A. Korf, Midland, MI (US); Keith Gere, Ida, MI (US)

(73) Assignee: Duro-Last, Inc, Saginaw, MI (US)

( * ) Notice: Subject to any disclaimer, the term of this patent is extended or adjusted under 35 U.S.C. 154(b) by 507 days.

(21) Appl. No.: 13/154,678

(22) Filed: Jun. 7, 2011

(65) Prior Publication Data

US 2011/0300336 A1    Dec. 8, 2011

Related U.S. Application Data

(60) Provisional application No. 61/352,193, filed on Jun. 7, 2010.

(51) Int. Cl.

| | |
|---|---|
| *B29C 65/00* | (2006.01) |
| *B30B 15/04* | (2006.01) |
| *B30B 15/34* | (2006.01) |
| *E04D 5/00* | (2006.01) |
| *E04D 15/04* | (2006.01) |
| *B29C 65/10* | (2006.01) |
| *B29L 31/10* | (2006.01) |
| *B29L 31/00* | (2006.01) |

(52) U.S. Cl.
CPC ............. *B30B 15/04* (2013.01); *B30B 15/041* (2013.01); *B30B 15/34* (2013.01); *E04D 5/00* (2013.01); *E04D 15/04* (2013.01); *B29C 65/103* (2013.01); *B29C 66/1122* (2013.01); *B29C 66/474* (2013.01); *B29C 66/524* (2013.01); *B29C 66/73921* (2013.01); *B29C 66/8362* (2013.01); *B29C 66/8652* (2013.01); *B29C 66/86533* (2013.01); *B29L 2031/108* (2013.01); *B29L 2031/003* (2013.01); *B29L 66/919* (2013.01)
USPC ............ 156/574; 156/391; 156/499; 156/579

(58) Field of Classification Search
USPC ........... 156/497, 499, 391, 71, 574, 579, 324, 156/297
See application file for complete search history.

(56) References Cited

U.S. PATENT DOCUMENTS

| | | | | |
|---|---|---|---|---|
| 1,615,561 | A | * | 1/1927 | Young ........................... 172/190 |
| 4,061,519 | A | * | 12/1977 | Hammer .................. 156/244.17 |
| 4,523,706 | A | * | 6/1985 | Haley ................................ 227/7 |
| 6,453,964 | B1 | | 9/2002 | Pfotenhauer et al. |
| 6,554,947 | B2 | | 4/2003 | Pfotenhauer et al. |

(Continued)

OTHER PUBLICATIONS

PCT Int'l App. No. PCT/US2011/39418 Sep. 22, 2011—International Search Report and Written Opinion.

*Primary Examiner* — John Goff

(74) *Attorney, Agent, or Firm* — Reising Ethington PC

(57) ABSTRACT

A method of applying a strip to a surface is disclosed. The strip is laid out spaced apart from a path guide. The path guide is referenced with least two longitudinally spaced apart reference guides to guide an applicator transversely spaced from the reference guides over the strip. The strip is lifted upstream of the applicator with a strip guide longitudinally spaced from the applicator to space the strip from the surface. Heat is applied to at least one of the strip or the surface in a location longitudinally between the applicator and the strip guide. The applicator is moved along the strip to apply pressure to the strip against the surface to bond the strip to the surface. A related apparatus for applying a strip to a surface is also disclosed.

11 Claims, 6 Drawing Sheets

(56) References Cited

U.S. PATENT DOCUMENTS

| | | | |
|---|---|---|---|
| 7,386,962 B2 * | 6/2008 | Estes et al. ...................... 52/553 |
| 7,686,056 B2 | 3/2010 | Peterson |
| 2003/0019586 A1 * | 1/2003 | Henegar ........................ 156/497 |
| 2006/0151107 A1 * | 7/2006 | Peterson .................... 156/309.6 |

* cited by examiner

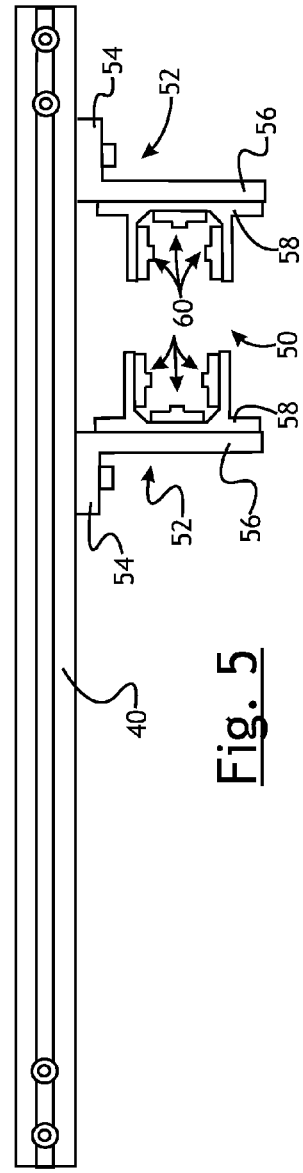
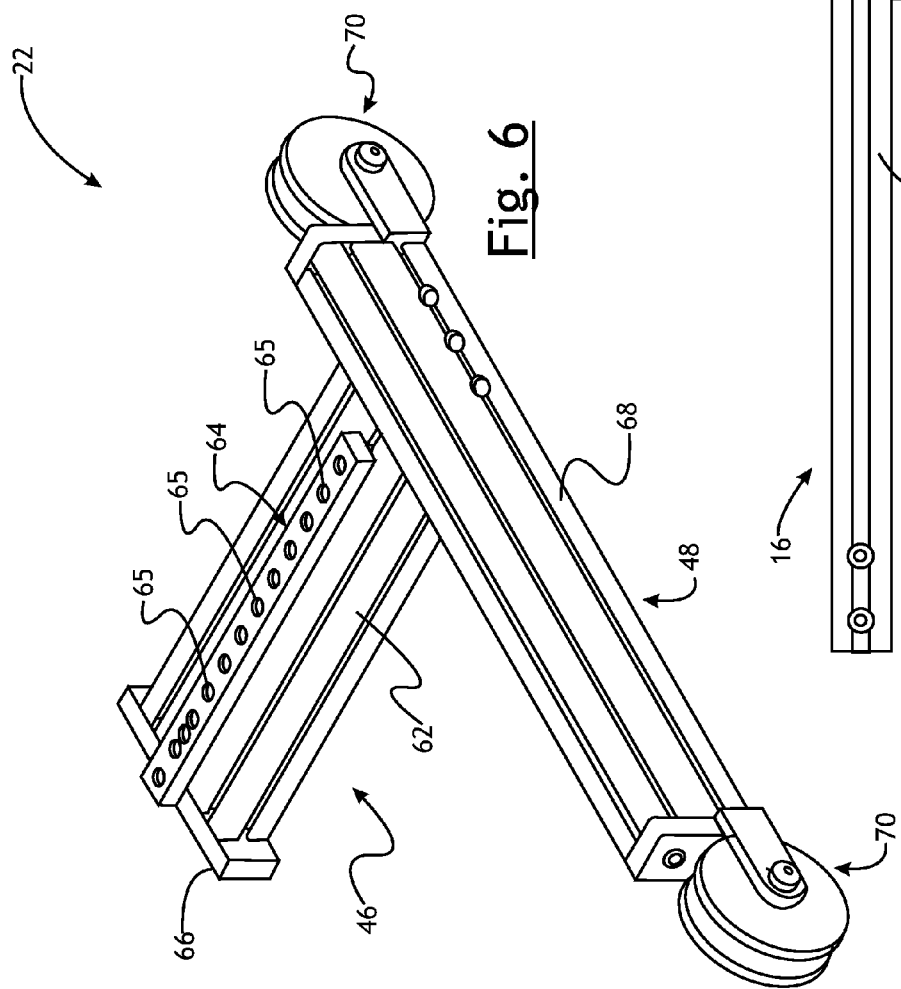

US 8,915,284 B2

METHOD AND APPARATUS FOR APPLYING STRIPS TO SURFACES

CROSS REFERENCE TO RELATED APPLICATION

This application claims the benefit of U.S. Provisional Application No. 61/352,193 filed Jun. 7, 2010. The disclosure of the above application is incorporated herein by reference.

TECHNICAL FIELD

The present invention generally relates to applying strips to surfaces and, more particularly, to methods and apparatuses for applying a decorative strip of thermoplastic material to a roof membrane of thermoplastic material.

BACKGROUND

It is generally known in the art to apply decorative thermoplastic strips to underlying thermoplastic roofing membranes. Current methods and apparatuses to apply the strips to the membranes have several disadvantages.

BRIEF SUMMARY

According to a first embodiment, an apparatus is provided to apply a strip to a surface. The apparatus includes a frame including a leading end, a trailing end, an application side, a guide side, and a longitudinal axis extending between the leading and trailing ends. The apparatus also includes an applicator to apply pressure to the strip and carried by the frame at the application side of the frame between the leading and trailing ends of the frame. The apparatus further includes a support carried by the frame at the application side of the frame longitudinally spaced from the applicator toward the trailing end of the frame. The apparatus additionally includes a subframe carried by the frame at the guide side to support the frame and guide the apparatus along a path guide.

In a variation of the first embodiment, the subframe includes an adjustment portion movably coupled to the frame in a direction transverse to the longitudinal axis of the frame and being adjustable between at least two positions to set spacing between a plurality of the strip. In this variation, the subframe also includes a follower portion extending from the adjustment portion and carrying at least two longitudinally spaced apart followers contactable with a path guide to guide the apparatus.

In another variation of the first embodiment, the apparatus also includes a strip guide carried at the application side of the frame between the applicator and the leading end of the frame.

In a further variation of the first embodiment, the apparatus further includes a heater carried at the leading end of the frame and movable in a direction transverse to the longitudinal axis of the frame along a transverse axis and pivotable about the transverse axis.

According to a second embodiment, a method of applying a strip to a surface is provided. The strip is laid out spaced apart from a path guide. The path guide is referenced with least two longitudinally spaced apart reference guides to guide an applicator transversely spaced from the reference guides over the strip. The strip is lifted upstream of the applicator with a strip guide longitudinally spaced from the applicator to space the strip from the surface. Heat is applied to at least one of the strip or the surface in a location longitudinally between the applicator and the strip guide. The applicator is moved along the strip to apply pressure to the strip against the surface to bond the strip to the surface.

BRIEF DESCRIPTION OF THE DRAWINGS

FIG. 1A is a schematic cross-sectional view of a portion of the apparatus of FIG. 1 applying the strip to the surface of FIG. 1;

FIG. 5 is a side view of the frame and subframe coupling of FIG. 4;

FIG. 6 is a perspective view of a subframe of the apparatus of FIG. 1;

DETAILED DESCRIPTION OF THE PREFERRED EMBODIMENTS

Figure 1:
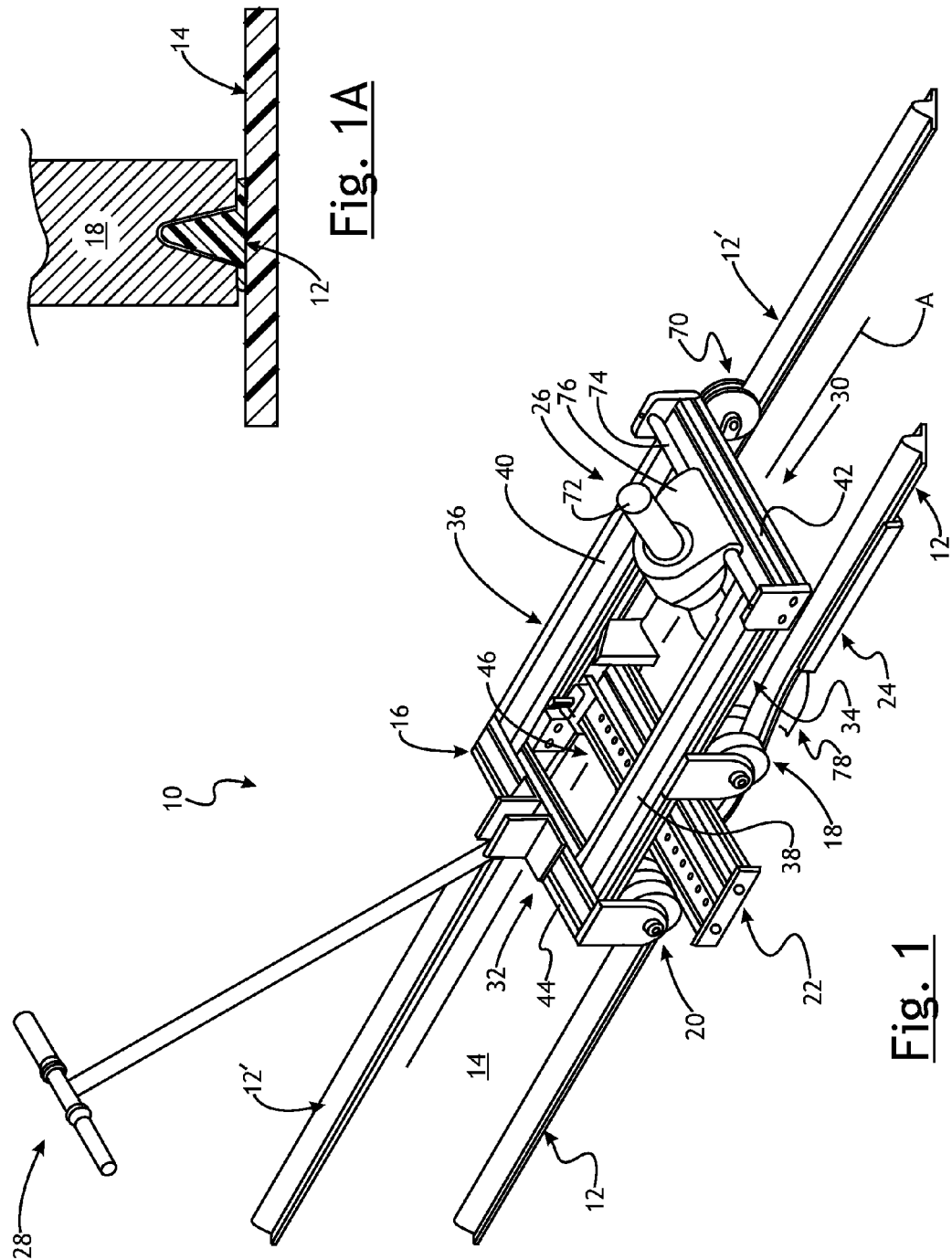
FIG. 1 is a perspective view of an exemplary embodiment of an apparatus for applying a strip to a surface.

FIG. 1 shows one exemplary embodiment of an apparatus 10 to apply a strip 12 to a surface 14 and with reference to a path guide 12'. The apparatus 10 may be a manual push or pull device, and the strip 12 and the surface 14 may be roofing materials. The strip 12 and the surface 14 may be heat weldable to one another, adherable to one another, or bondable in any other suitable manner with or without an adhesive. The path guide 12' may be a previously applied strip of thermoplastic material, an edge of a building structure, or any other suitable type of path guide. The path guide 12' and the applied strip 12 may be straight as shown but, in other embodiments, the strip 12 and guide 12' may be curved, angled, or oriented in any suitable manner.

The strip 12 may be of any suitable size and shape and may be of unitary construction or of multiple piece construction. The strip 12 may include a generally planar base, and a solid or hollow rib extending away from the base at a central portion thereof to define base flange portions on either side of the rib. The rib may be generally triangular in cross-sectional shape. The strip 12 may be extruded from polyvinyl chloride or may be produced in any other suitable manner of any other suitable thermoplastic material. The strip 12 may be for decorative purposes, for example, to simulate a standing seam rib of a metal roof, or for any other suitable purpose. The strip 12 may be constructed from a plurality of strips that may be butt-welded or otherwise coupled together. One example of a suitable strip is a DÉCOR PROFILE brand rib available from Sika Sarnifil of Canton, Mass.

The surface 14 may be a sheet of material, for example, a roofing membrane of single or multiple ply construction. In one embodiment, the membrane may be molded from polyvinyl chloride or may be produced in any other suitable manner of any other suitable thermoplastic material. One suitable membrane is available from Duro-Last Roofing, Inc., of Saginaw, Mich. In one embodiment, the material of the surface 14 is identical to the material of the strip 12. In other embodiments, the materials may be similar or may be dissimilar.

The apparatus 10 may include a frame 16, an applicator 18 carried by the frame 16 to apply pressure to the strip 12, a support 20 carried by the frame 16 to support the frame 16 and/or to further apply pressure to the strip 12, and a subframe 22 carried by frame 16 to further support the frame 16 and guide the apparatus 10 along the path guide 12'. The apparatus 10 also may include a strip guide 24 carried by the frame 16 to guide and lift the strip 12, a heater 26 carried by the frame 16 to heat the strip 12 and/or the surface 14, and a handle 28 for pushing and/or pulling the apparatus 10.

The frame 16 may include a leading end 30, a trailing end 32, an application side 34, a guide side 36, and a longitudinal axis A extending between the leading and trailing ends 30, 32. The frame 16 may include spaced apart rails 38, 40 and cross-members 42, 44 coupling the rails 38, 40 together. The rails 38, 40 and/or the cross-members 42, 44 may be assembled from sections of extruded aluminum using any suitable fasteners (not separately shown). In other embodiments, the frame 16 may be a weldment or a casting and composed of steel or iron. In yet other embodiments, the frame 16 may be of any suitable construction and composition.

The applicator 18 may be carried at the application side 34 of the frame 16 between the leading and trailing ends 30, 32 of the frame 16. The applicator 18 may be a rotatable wheel mounted to the frame 16 with suitable bracketry, axle, and the like, as shown, or may be a fixed member slidable along the strip 12, or may be of any other suitable construction and design. The applicator 18 may be carried by one or more applicator brackets coupled in any suitable manner to inboard and outboard sides of the application side rail 38.

As shown in FIG. 1A, the applicator 18 may be shaped in correspondence to the strip 12. For example, in the illustrated wheel embodiment, the wheel may be shaped like a sheave with spaced apart cylindrical portions for contacting the base flanges of the strip 12 and a triangular shaped cavity between the cylindrical portions to accept the rib of the strip 12. The cavity may be constructed and dimensioned so as to provide a clearance fit between the wheel and the rib so that only the cylindrical portions apply pressure to the base flanges of the strip 12. In another embodiment, the cavity may be constructed and dimensioned for an interference fit with the rib so as to apply downward pressure to the rib, so that pressure is applied not only to the base flanges but to the portion therebetween under the rib. The weight of the apparatus 10 may assist with bonding of the strip 12 to the surface 14.

As shown in FIG. 1, the support 20 may be carried at the application side 34 of the frame 16 and may be longitudinally spaced from the applicator 18 toward the trailing end 32 of the frame 16. As shown, the support 20 may be located at the trailing end 32 of the application side rail 38 of the frame 16, at a corner of the frame 16. The support 20 may be a rotatable wheel, as shown, or may be a fixed member slidable along the strip 12, or may be of any other suitable construction and design. The support 20 may be directly longitudinally in line with the applicator 18, and may be carried by one or more support brackets coupled in any suitable manner to inboard and outboard sides of the application side rail 38. The support 20 may be shaped in correspondence to the strip 12 with either a clearance fit or an interference fit, like the applicator 18.

Figure 3:
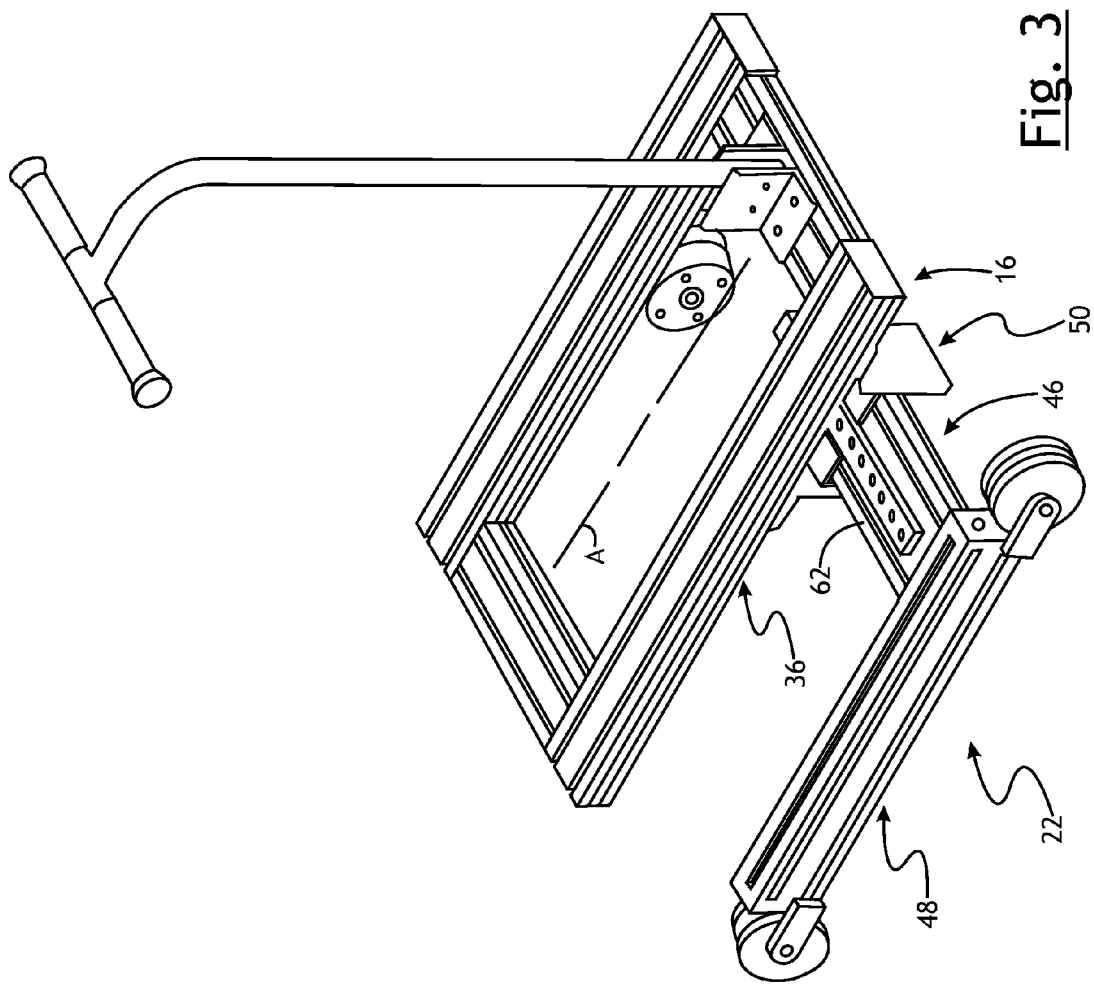
FIG. 3 is perspective view of a portion of the apparatus of FIG. 1.
Figure 4:
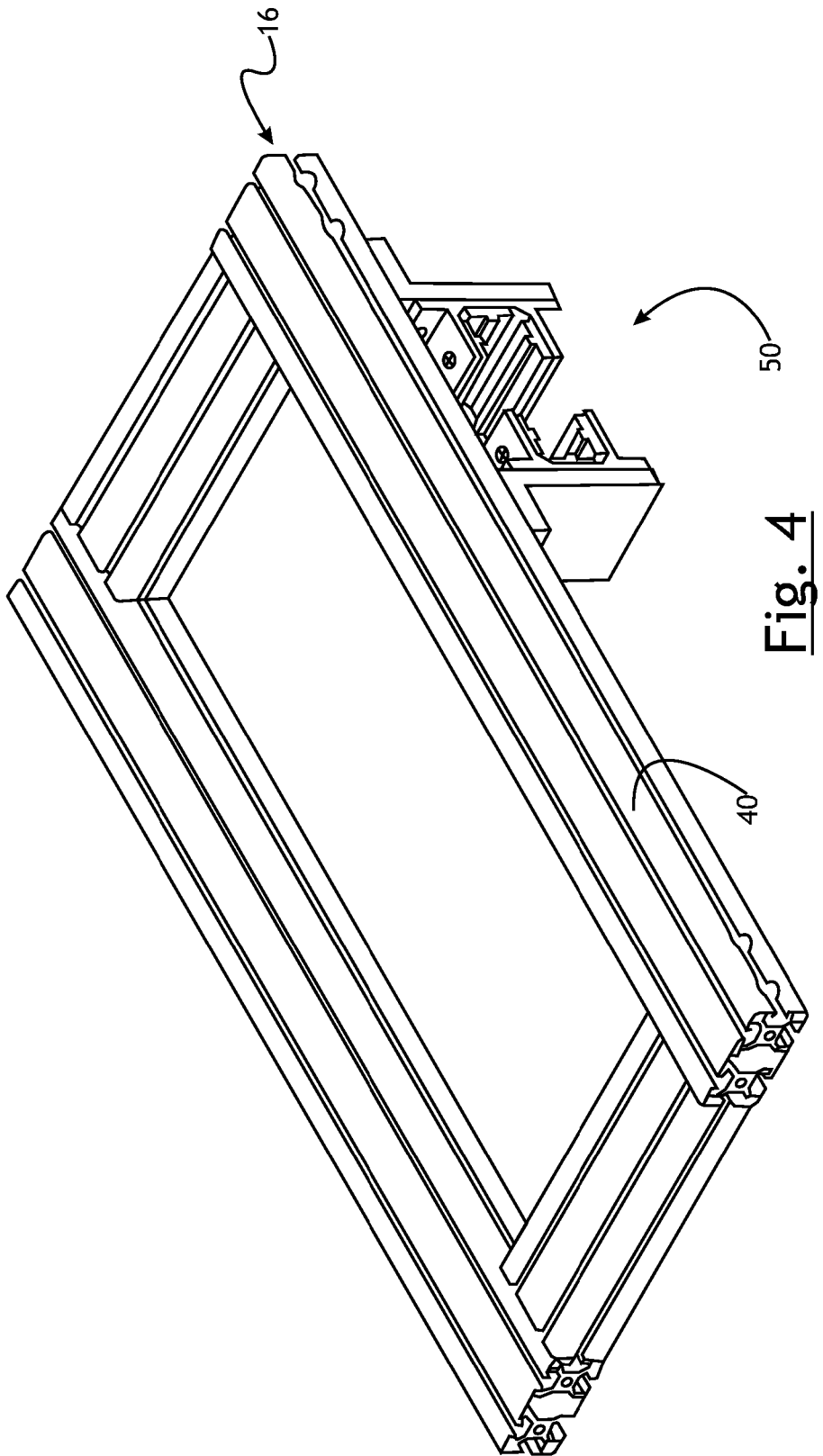
FIG. 4 is a perspective view of a frame and subframe coupling of the apparatus of FIG. 1.

As shown in FIG. 3, the subframe 22 may be carried at the guide side 36 of the frame 16 and may include an adjustment portion 46 and a follower portion 48, and may be coupled to the frame 16 by a coupling 50 that may be carried by the frame 16. As shown in FIG. 4, the coupling 50 may carried by the guide side rail 40 of the frame 16, for example, by being fastened to an undersurface thereof. As shown in FIG. 5, the coupling 50 may include opposed L-shaped brackets 52 having bases 54 coupled to the frame 16 and opposed flanges 56 extending from the bases 54. The coupling 50 also may include opposed U-shaped brackets 58 coupled to the opposed flanges 56 in any suitable manner, and tongue plates 60 coupled to the U-shaped brackets 58 in any suitable manner. The aforementioned components or any combination thereof may be separate as shown, or may be integrated into one or more unitary components in any suitable manner.

Figure 2:
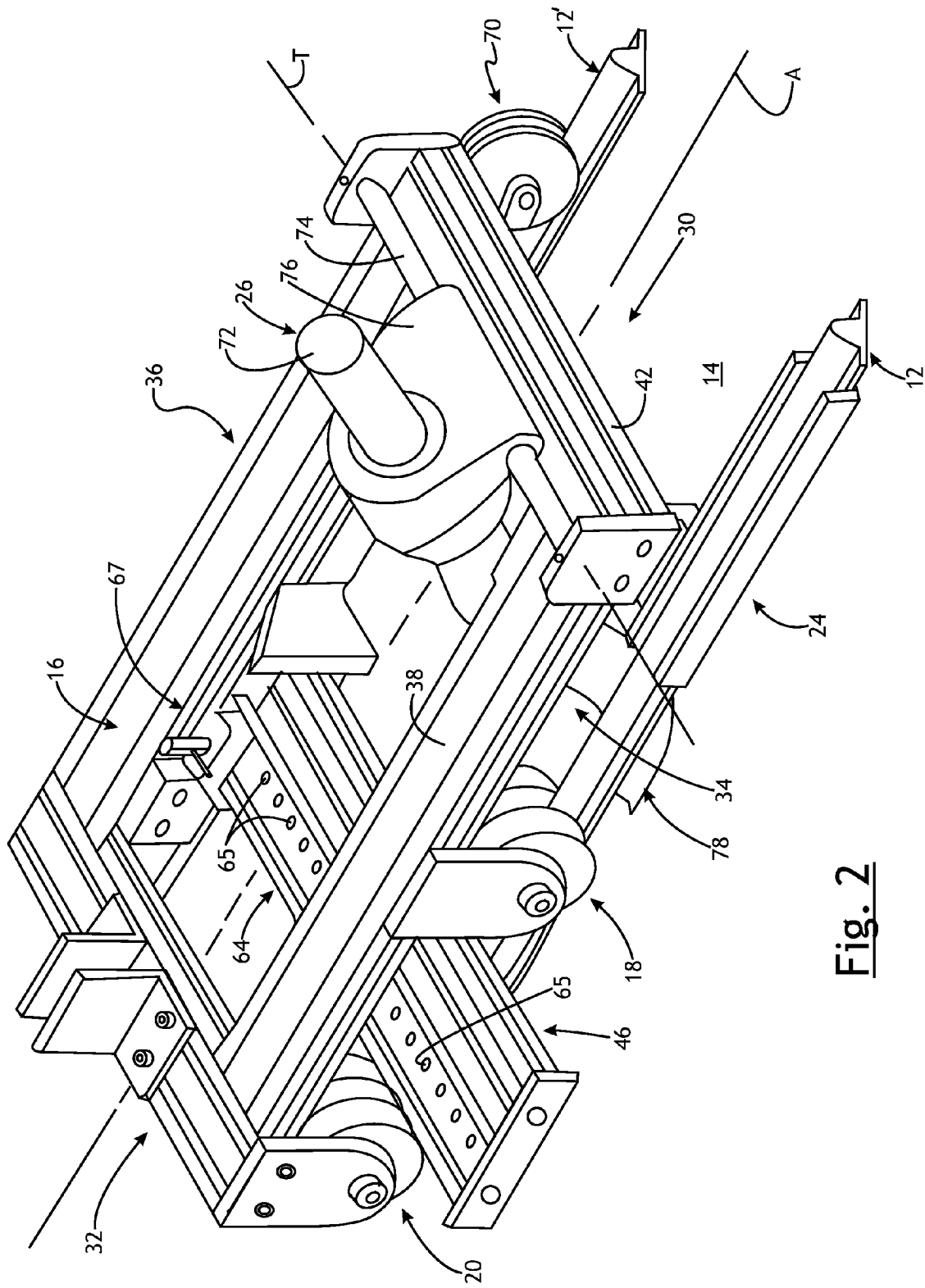
FIG. 2 is an enlarged perspective view of the apparatus of FIG. 1.

Referring again to FIG. 3, the adjustment portion 46 of the subframe 22 is movably coupled to the frame 16 in a direction transverse to the longitudinal axis A of the frame 16, and may be adjustable between at least two positions to set spacing between strips 12, 12' (FIG. 1). As shown in FIG. 6, the adjustment portion 46 may include a body 62 for slidable receipt in the coupling 50 (FIG. 5), a lock strip 64 integrated with or coupled to the body 62 in any suitable manner and having a plurality of lock features 65, and a slide stop 66 integrated with or coupled to the end of the body 62 in any suitable manner. The body 62 may be received in the coupling U-shaped brackets 58 (FIG. 5) and may include grooves for cooperation with tongues of the bracket tongue plates 60 (FIG. 5). As shown in FIG. 2, the adjustment portion 46 of the subframe 22 also may include a lock 67 that may be coupled to the frame 16 by any suitable bracketry and fasteners or in any other suitable manner. The lock 67 cooperates with the lock features 65 of the lock strip 64 to set spacing between the strips 12, 12'. The lock features 65 may be holes, pockets, or the like, and the lock 67 may include a pin with coarse threads that may be rotated a quarter-turn to release the lock 67 from a corresponding lock feature 65 and rotated back to engage the lock 67 to the lock feature 65. In another embodiment, the lock 67 may include a spring loaded pin that may be retracted to disengage the lock 67 and released to engage the lock 67. It will be appreciated by those of ordinary skill in the art that the lock 67 may be of any suitable configuration. The adjustment portion 46 may be configured to provide transverse or width adjustment of the apparatus 10 in any suitable magnitude and increments, for example, between fourteen to thirty inches and, more particularly, between eighteen to twenty four inches, with one inch increments.

As shown in FIG. 6, the follower portion 48 of the subframe 22 may be integral with or separately coupled to the adjustment portion 46 in any suitable manner, and may extend from an outboard end of the body 62. The follower portion 48 may include a follower body 68 that may carry longitudinally spaced apart reference guides or followers 70 that may cooperate with the path guide 12' (FIG. 1) to guide the apparatus 10 (FIG. 1). The followers 70 may include rotatable members like wheels or rollers with suitable bracketry, axles, and the like, as shown, or may be fixed members slidable along the path guide 12', or of any other suitable construction and design. The followers 70 may include brackets or the like to hold the wheels, and may be located at longitudinally opposed ends of the follower body 68. The followers 70 may be shaped in correspondence to the path guide 12' with either a clearance fit or an interference fit, like the applicator 18. Also, the followers 70 may include cylindrical portions to contact corresponding flange portions of the path guide 12'. Accordingly, the followers 70 may be used to apply further pressure to a previously applied strip (12').

Figure 7:
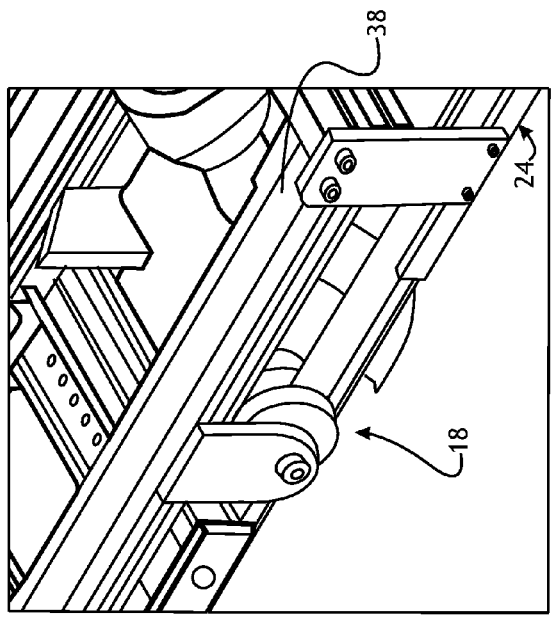
FIG. 7 is an enlarged perspective view of the apparatus of FIG. 1.

Referring to FIG. 2, the strip guide 24 may be carried at the application side 34 of the frame 16 between the applicator 18 and the leading end 30 of the frame 16. The strip guide 24 lifts the strip 12 upstream of the applicator 18 to space the strip 12 away from the underlying surface 14 to allow heat to be applied to corresponding surfaces of the strip 12 and/or the surface 14. The strip guide 24 may include a generally U-shaped channel carried in any suitable manner by bracketry that may be coupled to the frame 16 in any suitable manner. In the embodiment illustrated in FIG. 2, the strip guide 24 is mounted to an inboard side of the applicator side rail 38 by an L-shaped bracket have a free flange extending in an outboard direction. In another embodiment, shown in FIG. 7, the strip guide 24 is mounted to an outboard side of the applicator side rail 38 by an L-shaped bracket having a free flange extending in an inboard direction. In either embodiment, the strip guide 24 may extend in a generally longitudinal alignment with the applicator 18.

Figure 8:
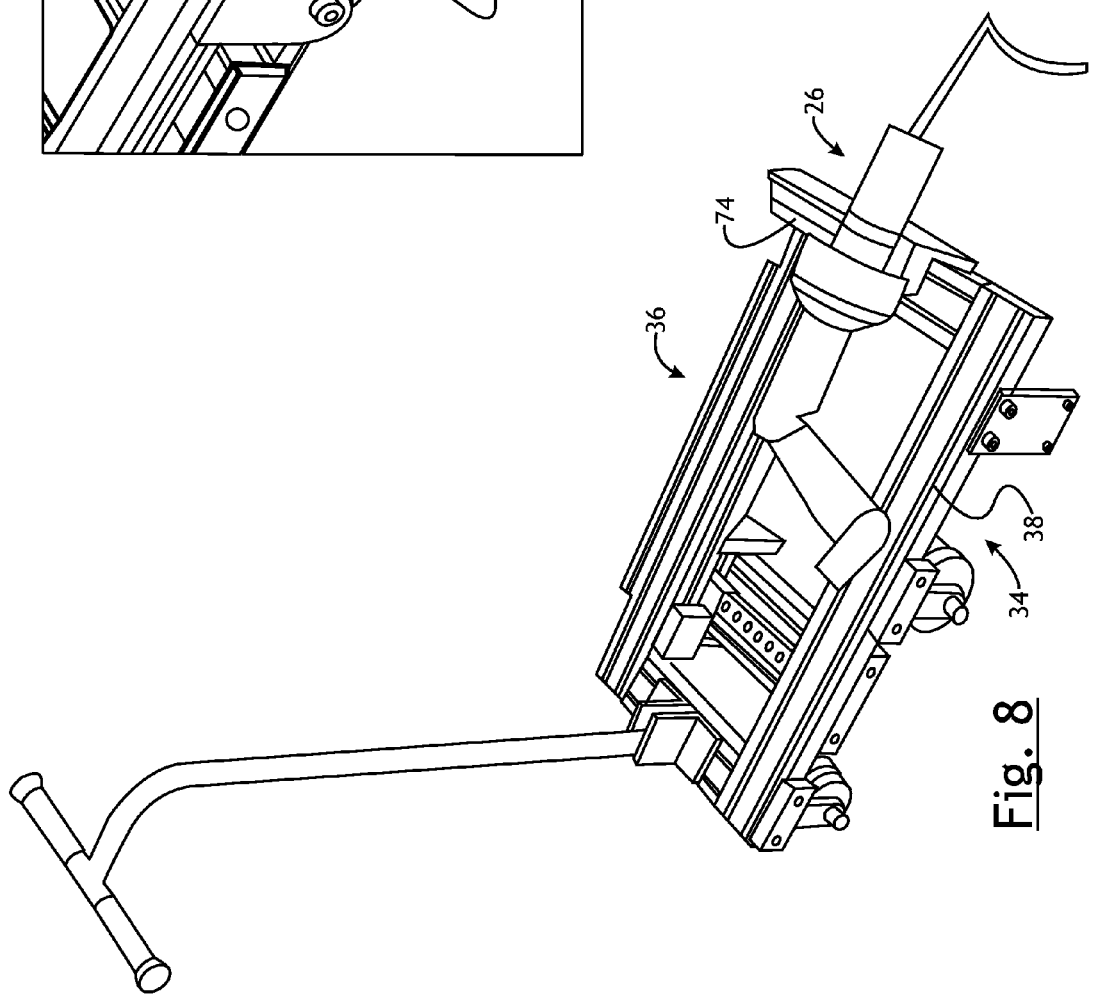
FIG. 8 is a perspective view of the apparatus of FIG. 1, illustrating a heater in a rest position.

As shown in FIG. 1, the heater 26 may be carried at the leading end 30 of the frame 16 and may be movable in a direction transverse to the longitudinal axis A of the frame 16 along a transverse axis T and may be pivotable about the transverse axis T. The heater 26 may include a heat gun 72 that may be mounted to a rod 74 by a holder 76 that, in turn, is mounted to the frame 16 by suitable bracketry or the like. Suitable heat guns may include but are not limited to, heat guns made by LEISTER® (TRIAC brand), FORSTHOFF®, or SINCLAIR® but it will be appreciated that any suitable heat gun may be used. The heater 26 also may include a nozzle 78 that may be coupled to the heat gun 72 and configured to extend from the heat gun 72 to a location longitudinally between the strip guide 24 and the applicator 18 and vertically between the strip 12 and the underlying surface 14 so as to apply heat therebetween. The heater 26 may be pivotable and transversely slidable about the rod 74, so that the heater 26 may be slid toward the guide side 36, pivoted upwardly, slid back toward the applicator side 34 and allowed to rest on the applicator side rail 38 as shown in FIG. 8. In operation, the heat gun 72, having the nozzle 78 thereon, may be operated at a temperature of, for example, 500° F. to 800° F. The settings for individual heat guns may vary. It is preferred, however, that in one embodiment the heat gun 72 be set to achieve temperatures at the corresponding strip and sheet surfaces necessary to weld the strip 12 and surface 14.

As shown in FIG. 1, the handle 28 may coupled to the frame 16, for example, at the trailing end 32 of the frame 16. More specifically, the handle 28 may be a push-handle coupled to the trailing end cross member 44 of the frame 16 by any suitable bracketry and fasteners as shown. In other embodiments, the handle 28 may be coupled to other portions of the frame 16 like the side rails 38, 40, or the leading end cross member 42 in a pull-handle embodiment. Accordingly, the apparatus 10 may be manually propelled in a push or pull manner.

Various components of the apparatus 10 may be of 6061 aluminum composition, steel, iron, polymeric material, composites, or any other suitable material(s). The various components may be of extruded, cast, forged, machined, and/or molded construction, or of any other suitable construction.

In accordance with the various embodiments, an exemplary method generally involves applying strips, for example, to an underlying surface. Portions of the method may be described in reference to FIGS. 1-8. The method steps may or may not be sequentially processed, and the invention may encompass any sequencing, overlap, or parallel processing of such steps.

As exemplified in FIG. 1, a strip 12 is laid out spaced apart from a path guide 12'. The path guide 12' may be a previously laid strip or some other type of path guide. The path guide 12' is referenced with least two longitudinally spaced apart followers 70 to guide an applicator 18 transversely spaced from the followers 70 over the strip 12. The strip 12 is lifted upstream of the applicator 18 with a strip guide 24 longitudinally spaced from the applicator 18 to space the strip 12 from the surface 14. Heat is applied to at least one of the strip 12 or the surface 14 in a location longitudinally between the applicator 18 and the strip guide 24. The applicator 18 is moved along the strip 12 to apply pressure to the strip 12 against the surface 14 to help bond the strip 12 to the surface 14.

In one embodiment, the path guide 12' is laid out and bonded to the surface 14 by hand to ensure that subsequently applied strips 12 will be applied correctly. Thereafter, the first strip 12 to be applied can be fed over the strip guide 24 and under the applicator 18 until an end of the strip 12 is located at a suitable location like a roof ridge. Then, the heater nozzle 78 can be moved into place between the strip 12 and the surface 14 and bonding can begin. For the first and last foot or so of the strip 12, the strip 12 may need to be manually bonded to the surface 14.

The foregoing description is considered illustrative only. The terminology that is used is intended to be in the nature of words of description rather than of limitation. Many modifications and variations will readily occur to those skilled in the art in view of the description. Thus, the foregoing description is not intended to limit the invention to the embodiments described above. Accordingly the scope of the invention as defined by the appended claims.

What is claimed is:

1. An apparatus to apply a strip to a surface, the apparatus comprising:
    a frame including:
        a leading end,
        a trailing end,
        an application side,
        a guide side, and
        a longitudinal axis extending between the leading and trailing ends;
    an applicator to apply pressure to the strip and carried by the frame at the application side of the frame between the leading and trailing ends of the frame;
    a support carried by the frame at the application side of the frame longitudinally spaced from the applicator toward the trailing end of the frame;
    a subframe carried by the frame at the guide side to support the frame and guide the apparatus along a path guide, the subframe including an adjustment portion movably coupled to the frame in a direction transverse to the longitudinal axis of the frame and being adjustable between at least two positions to set strip spacing; and
    a heater carried at the leading end of the frame and movable in a direction transverse to the longitudinal axis of the frame along a transverse axis and pivotable about the transverse axis.

2. The apparatus of claim 1 wherein said subframe includes a follower portion extending from the adjustment portion and carrying at least two longitudinally spaced apart followers contactable with a path guide to guide the apparatus.

3. The apparatus of claim 2, further comprising a coupling carried by the frame and wherein the adjustment portion of the subframe includes a body for slidable receipt in the coupling.

4. The apparatus of claim 3, wherein the adjustment portion also includes a lock strip having a plurality of lock features, and a lock coupled to the frame for cooperation with the lock features of the lock strip.

5. The apparatus of claim 2, wherein the adjustment portion is configured to provide width adjustment of the apparatus between fourteen and thirty inches with one inch increments.

6. The apparatus of claim 2, wherein the follower portion includes a follower body that carries the longitudinally spaced apart followers, which include rotatable members.

7. The apparatus of claim 1, further comprising a strip guide carried at the application side of the frame between the applicator and the leading end of the frame.

8. The apparatus of claim 7, wherein the strip guide lifts the strip upstream of the applicator to space the strip away from the surface to allow heat to be applied to a corresponding surface of the strip.

9. The apparatus of claim 1, wherein the heater is mounted to a rod by a holder that is mounted to the frame, wherein the heater is pivotable and transversely slidable about the rod so that the heater may be slid toward the guide side of the frame, pivoted upwardly, slid back toward the application side of the frame and allowed to rest on an applicator side rail.

10. An apparatus to apply a strip to a surface, the apparatus comprising:
- a frame including:
  - a leading end,
  - a trailing end,
  - an application side,
  - a guide side, and
  - a longitudinal axis extending between the leading and trailing ends;
- an applicator to apply pressure to the strip and carried by the frame at the application side of the frame between the leading and trailing ends of the frame;
- a support carried by the frame at the application side of the frame longitudinally spaced from the applicator toward the trailing end of the frame;
- a subframe carried by the frame at the guide side and including:
  - an adjustment portion movably coupled to the frame in a direction transverse to the longitudinal axis of the frame and being adjustable between at least two positions to set spacing between a plurality of the strip, and
  - a follower portion extending from the adjustment portion and carrying at least two longitudinally spaced apart followers contactable with a path guide to guide the apparatus;
- a strip guide carried at the application side of the frame between the applicator and the leading end of the frame, the strip guide lifting the strip vertically away from the surface; and
- a heater carried by the frame, the heater including a nozzle extendable to a location longitudinally between the applicator and the strip guide and vertically between the strip and the surface to apply heat thereat.

11. The apparatus of claim 10, wherein the apparatus is manually propelled.

* * * * *